(12) United States Patent
Kleinpenning et al.

(10) Patent No.: US 10,003,210 B2
(45) Date of Patent: Jun. 19, 2018

(54) CONTROLLER FOR A SWITCHED MODE POWER SUPPLY AND ASSOCIATED METHODS

(71) Applicant: NXP B.V., Eindhoven (NL)

(72) Inventors: Jeroen Kleinpenning, Nijmegen (NL); Jan Dikken, Nijmegen (NL)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 14/827,758

(22) Filed: Aug. 17, 2015

(65) Prior Publication Data

US 2016/0079790 A1 Mar. 17, 2016

(30) Foreign Application Priority Data

Sep. 12, 2014 (EP) .................................... 14184675

(51) Int. Cl.
*G05F 1/10* (2006.01)
*H02J 7/00* (2006.01)
(Continued)

(52) U.S. Cl.
CPC .......... *H02J 7/0081* (2013.01); *H02J 7/0073* (2013.01); *H02M 3/1588* (2013.01);
(Continued)

(58) Field of Classification Search
CPC ....... H02M 3/1582; H02M 2001/0009; H02M 1/38; H02M 3/156; H02M 7/003; Y02B 70/1466
(Continued)

(56) References Cited

U.S. PATENT DOCUMENTS

| 4,937,728 A | 6/1990 | Leonardi |
| 6,307,356 B1 * | 10/2001 | Dwelley ............... H02M 3/156 323/282 |

(Continued)

FOREIGN PATENT DOCUMENTS

| EP | 2 509 203 A1 | 10/2012 |
| JP | 2010166729 A | 7/2010 |

OTHER PUBLICATIONS

Extended European Search Report for EP Patent Appln. No. 14184675.8 dated (Feb. 26, 2015).
(Continued)

*Primary Examiner* — Rajnikant Patel

(57) ABSTRACT

A controller for a switched mode power supply, wherein the controller is configured to be connected to a synchronous rectifier. The controller comprising:
 a voltage comparator configured to determine satisfaction of a voltage criterion, wherein the voltage criterion is satisfied when a conduction channel voltage between a first-conduction-channel terminal and a second-conduction-channel terminal meets a first pre-determined voltage threshold; and
 a timer configured to determine satisfaction of a time criterion, wherein the time criterion is satisfied when a voltage associated with the synchronous rectifier meets a second predetermined voltage threshold for greater than a pre-determined time;
 the controller configured to provide for a normal mode of operation based on satisfaction of the voltage criterion and a power-saving mode of operation based on satisfaction of the time criterion, wherein the controller is configured to draw a power-saving-mode current in the power-saving mode of operation, and draw a normal-mode current in the normal mode of operation, wherein (Continued)

a magnitude of the normal-mode current is greater than a magnitude of the power-saving-mode current.

15 Claims, 3 Drawing Sheets

(51) Int. Cl.
*H02M 3/158* (2006.01)
*H02M 1/00* (2006.01)

(52) U.S. Cl.
CPC .............. *H02M 2001/0006* (2013.01); *H02M 2001/0035* (2013.01); *Y02B 70/1466* (2013.01); *Y02B 70/16* (2013.01)

(58) Field of Classification Search
USPC ........ 323/222, 224, 257, 259, 271, 282–288
See application file for complete search history.

(56) References Cited

U.S. PATENT DOCUMENTS

| | | | |
|---|---|---|---|
| 6,606,257 B2 | 8/2003 | Bourdillon | |
| 7,298,119 B1 * | 11/2007 | Amram Summit | H02M 3/1582 323/225 |
| 7,808,217 B2 * | 10/2010 | de Cremoux | H02M 3/1582 323/222 |
| 7,936,575 B2 | 5/2011 | Hu | |
| 8,278,889 B2 * | 10/2012 | Tateishi | H02M 3/1588 323/271 |
| 8,456,868 B2 * | 6/2013 | He | H02M 3/33592 323/286 |
| 8,502,414 B2 * | 8/2013 | Lee | G06F 1/266 307/31 |
| 8,570,772 B2 | 10/2013 | Morris et al. | |
| 8,699,243 B2 | 4/2014 | Sims et al. | |
| 8,749,996 B2 * | 6/2014 | Hosotani | H02M 3/33507 363/16 |
| 9,197,132 B2 * | 11/2015 | Artusi | H02M 1/4225 |
| 2011/0006706 A1 | 1/2011 | Zhang et al. | |
| 2011/0012538 A1 | 1/2011 | Ren et al. | |
| 2013/0003421 A1 | 1/2013 | Fang | |
| 2014/0098578 A1 * | 4/2014 | Halberstadt | H02M 3/33515 363/21.15 |

OTHER PUBLICATIONS

Texas Instruments: "Green Rectifier (TM) Controller Device"; retrieved from the internet Apr. 18, 2017: URL:http://pdf1.alldatasheet.com/datasheet-pdf/view/392290/TIUCC24610.html; 34 pages (Sep. 30, 2010).

* cited by examiner

CONTROLLER FOR A SWITCHED MODE POWER SUPPLY AND ASSOCIATED METHODS

CROSS-REFERENCE TO RELATED APPLICATIONS

This application claims the priority under 35 U.S.C. § 119 of European patent application no. 14184675.8, filed on Sep. 12, 2014, the contents of which are incorporated by reference herein.

The present disclosure relates to a controller for a switched mode power supply, and more particularly to a controller for a synchronous rectifier associated with a switched mode power supply.

According to a first aspect, there is provided a controller for a switched mode power supply, wherein the controller is configured to be connected to a first-conduction-channel terminal, a second-conduction-channel terminal and a control terminal of a synchronous rectifier, the controller comprising: a voltage comparator configured to determine satisfaction of a voltage criterion, wherein the voltage criterion is satisfied when a conduction channel voltage between the first-conduction-channel terminal and the second-conduction-channel terminal meets a first pre-determined voltage threshold; and a timer configured to determine satisfaction of a time criterion, wherein the time criterion is satisfied when a voltage associated with the synchronous rectifier meets a second predetermined voltage threshold for greater than/during a pre-determined time; the controller configured to provide for a normal mode of operation based on satisfaction of the voltage criterion and a power-saving mode of operation based on satisfaction of the time criterion, wherein the controller is configured to draw a power-saving-mode current in the power-saving mode of operation, and draw a normal-mode current in the normal mode of operation, wherein a magnitude of the normal-mode current is greater than a magnitude of the power-saving-mode current.

Reducing the current from the normal-mode current to the power-saving-mode current advantageously saves electrical power when the switched mode power supply is subject to no load or to a light load. Increasing the current from the power-saving-mode current to the normal-mode current advantageously allows the controller to provide for active switching of the synchronous rectifier when the switched mode power supply is subject to a non-zero load.

The pre-determined time may be non-zero or zero. Using a pre-determined time of zero may be particularly beneficial if the voltage associated with the synchronous rectifier is a control terminal voltage. Setting the time threshold to a non-zero value may advantageously enable the controller to change its mode of operation power less frequently than would occur when the pre-determined time is zero. Setting the time threshold to zero may advantageously enable power to be saved as soon as there is no energy conversion by the switched mode power supply.

The voltage associated with the synchronous rectifier may be the voltage between the first-conduction-channel terminal and the second-conduction-channel terminal or a control terminal voltage.

The magnitude of the normal-mode current, which may not include the current for charging the gates of the Synchronous Rectifiers, may be at least 2, 5, or 10 times greater than the magnitude of the power-saving-mode current. The magnitude of the power-saving-mode current may be 400 microamps or less, 200 microamps or less (for example for a low power consumption of 1 mW for a 5V output voltage) or may be 50 microamps or less (for example for an application with 20V output voltage).

The controller may be configured to be connected to a first-conduction-channel terminal, a second-conduction-channel terminal and a control terminal of a second synchronous rectifier. The controller may further comprise: a voltage comparator configured to determine satisfaction of a second voltage criterion when a second conduction channel voltage between the first-conduction-channel terminal of the second synchronous rectifier and the second-conduction-channel terminal of the second synchronous rectifier meets the first pre-determined voltage threshold; and a timer configured to determine satisfaction of a second time criterion, wherein the second time criterion is satisfied when a voltage associated with the second synchronous rectifier meets a second predetermined voltage threshold for greater than a pre-determined time. The controller may be configured to provide for a normal mode of operation based on satisfaction of the second voltage criterion and a power-saving mode of operation based on satisfaction of the second time criterion. The controller may be configured to provide for the power-saving mode of operation when both the time criterion for the first synchronous rectifier and the second time criterion for the second synchronous rectifier are satisfied. Also, the controller may be configured to provide for the normal mode of operation when a voltage criterion has been met for at least one of the first synchronous rectifier and the second synchronous rectifier.

The pre-determined time may be larger than 50 microseconds. This can be advantageous because a SMPS can enter a burst mode at low power for avoiding the switching operation in the audible region below 20 kHz.

The synchronous rectifier may comprise a body diode with a particular forward voltage. The first pre-determined voltage threshold may be based on the particular forward voltage.

The switched mode power supply may be configured to operate in a burst mode with a particular temporal periodicity. The pre-determined time may be based on the particular temporal periodicity.

There may be provided a switched mode power supply comprising: a primary side and a secondary side, the secondary side comprising any controller disclosed herein and an associated synchronous rectifier. The primary side may be galvanically isolated from the secondary side.

The associated synchronous rectifier may be configured to operate as an active diode in accordance with a control signal received at its control terminal.

There may be provided a switched mode power supply wherein the synchronous rectifier is a Field Effect Transistor.

There may be provided an integrated circuit comprising any controller disclosed herein. The integrated circuit may also comprise one or more associated synchronous rectifiers. Such an integrated circuit may be referred to as a module.

Examples of the invention will now be described in detail with reference to the accompanying figures, in which.

Switched mode power supplies (SMPSs) may conform to a variety of different topologies, with an input side that receives electrical power and an output side that provides an electrical power output. Some examples of switched mode power supplies comprise a primary side and a secondary side wherein the primary side is galvanically isolated from the secondary side, such as flyback converters, forward converters and resonant converters. Some examples do not isolate the input side from the output side, such as boost converters, buck converters or buck-boost converters.

SMPSs may be used in adapters and power converters. In such applications the size and efficiency of the SMPS may be very important. In particular, if a device is small and has a high power output then it may particularly benefit from having a high efficiency in order to maintain a low temperature for the device and its outer casing. Improvements in efficiency may be obtained by providing synchronous rectification at an AC to DC output side of the SMPS. In applications where rectification is provided by diodes the rectification losses are about equal to the diode voltage multiplied by the load current. An advantageous efficiency improvement can therefore be obtained by applying synchronous rectification with almost zero rectification losses.

SMPSs can comprise a power switch. The power switch may be a transistor, such as a field effect transistor, including a Metal Oxide Semiconductor Field Effect Transistor (MOSFET). The SMPS may also comprise one or more active/synchronous rectifiers at the output side of the SMPS, which is the secondary side for isolated SMPSs. A synchronous rectifier is a switch that is actively controlled in order for it to provide the same functionality as a diode: the switch is controlled to be closed when the conduction channel of the switch is forward biased and is open when the conduction channel of the switch is reverse biased. The switch may be a Metal Oxide Semiconductor Field Effect Transistor (MOSFET). Such a synchronous rectifier can be more efficient, and waste less power than a conventional diode. A controller can be used for controlling the synchronous rectifier/switch. The controller will consume electrical power in order to perform its function. If the amount of electrical power consumed by the controller is reduced, then the reduction will provide for an improvement in the efficiency of the SMPS. The present disclosure provides a method and associated apparatus for reducing the power consumed by such controllers, particularly, although not necessarily, under conditions of no-load or light load.

Figure 1:
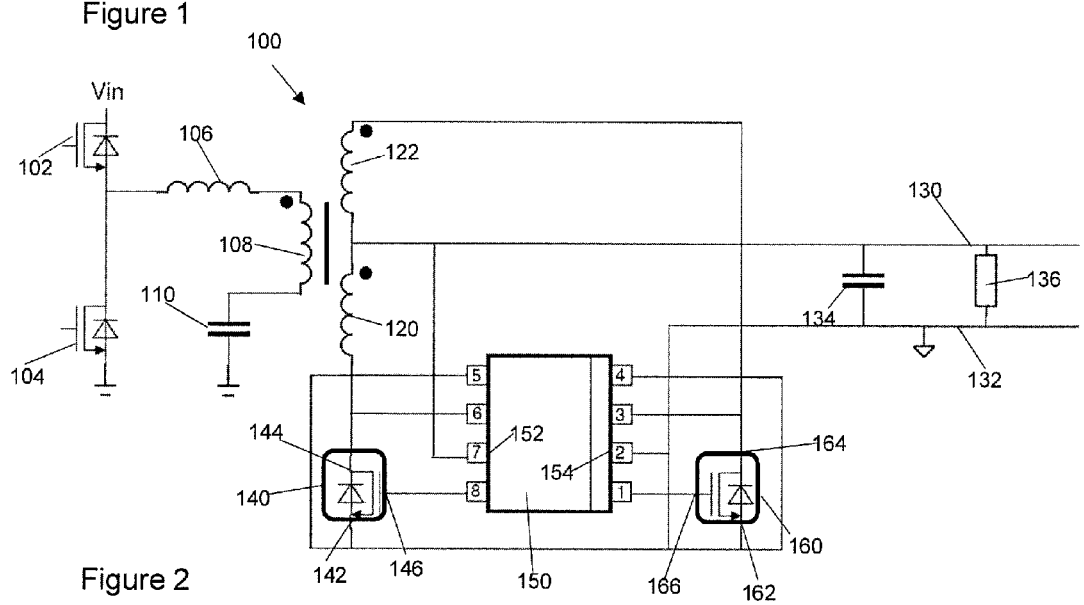
FIG. 1 shows a switched mode power supply.

FIG. 1 shows a controller 150 for at least a first synchronous rectifier 140 in a switched mode power supply 100. The controller 150 is connected to a first-conduction-channel terminal 142, a second-conduction-channel terminal 144 and a control terminal 146 of the first synchronous rectifier, which in this example is a transistor. The controller 150 provides the functionality of a voltage comparator configured to determine satisfaction of a voltage criterion, wherein the voltage criterion is satisfied when a conduction channel voltage between the first-conduction-channel terminal 142 and the second-conduction-channel terminal 144 meets a first pre-determined voltage threshold. The controller 150 also provides the functionality of a timer configured to determine satisfaction of a time criterion, wherein the time criterion is satisfied when a voltage associated with the first synchronous rectifier 140 meets a second predetermined voltage threshold for greater than a pre-determined time. As will be discussed in more detail below, this pre-determined time may be zero or a non-zero value. The controller 150 can provide for a normal mode of operation based on satisfaction of the voltage criterion and a power-saving mode of operation based on satisfaction of the time criterion. The controller 150 draws a power-saving-mode current in the power-saving mode of operation, and draws a normal-mode current in the normal mode of operation. Advantageously, a magnitude of the normal-mode current is greater than a magnitude of the power-saving-mode current. In this way, the amount of power (which is proportional to the amount of current drawn for a constant voltage) consumed when the controller 150 is in the power-saving mode of operation can be reduced on the assumption that the controller 150 will have sufficient power in this mode to wake-up and become operational again in a satisfactory amount of time. The power-saving current can be considered as sufficient for the controller 150 to be able to determine whether or not the voltage criterion has been satisfied and therefore whether or not the controller 150 should be put in the normal mode of operation.

It will be appreciated that, while FIG. 1 shows a SMPS 100 in the form of a resonant converter with a first synchronous rectifier 140 and a second synchronous rectifier 160, aspects of the present disclosure may be relevant to other topologies of SMPS, included non-isolated and other isolated topologies, which may have one or more synchronous rectifiers.

A primary side of the SMPS 100 of FIG. 1 comprises a first power switch 102 and a second power switch 104 in series with each other. In parallel with the second power switch 104 is a resonant tank that in this example includes a first inductance 106, a primary winding 108 (which can be considered as a second inductance) and a capacitance 110. The primary winding 108 is part of a transformer that provides a galvanically isolated link from the primary side to a secondary side of the SMPS 100. The secondary side of the transformer comprises a first secondary winding 120 and a second secondary winding 122. It will be appreciated that the presence of two transformer windings in the secondary side of the resonant converter 100 is not essential to the present disclosure.

The first secondary winding 120 is connected to a first output terminal and to a first synchronous rectifier 140. In this example, the first output terminal 130 is an output voltage terminal 130. The first synchronous rectifier 140 is connected to a second output terminal, which in this example is ground 132. In some examples the second output terminal 132 may be considered as a reference terminal. A smoothing capacitor 134 is also connected between the first output terminal 130 and the second output terminal 132. The first output terminal 130 and the second output terminal 132 are configured to provide power to a load 136. It will be appreciated that the load 136 may vary in magnitude and that in some examples, at some times, the load may be removed and the SMPS operates in no-load condition.

In FIG. 1 the first synchronous rectifier 140 comprises a transistor with a first-conduction-channel terminal 142, a second-conduction-channel terminal 144 and a control terminal 146. In some examples the transistor may comprise a field effect transistor, in which case the first-conduction-channel terminal 142 will be a source terminal, the second-conduction-channel terminal 144 will be a drain terminal and the control terminal 146 will be a gate terminal. The first-conduction-channel terminal 142 is connected to the second output terminal 132, and the second-conduction-channel terminal is connected to the first secondary winding 120.

The first synchronous rectifier 140 is connected to a controller 150. In particular, the first-conduction-channel terminal 142, the second-conduction-channel terminal 144 and the control terminal 146 are each connected to respective pins of the controller 150. In this way, the controller 150 can monitor the voltage difference between the first-conduction-channel terminal 142 and the second-conduction-channel terminal 144, and can provide a control signal to the control terminal 146 of the first synchronous rectifier 140. The controller 150 also includes a first power supply terminal and a second power supply terminal, which in this example are connected to the first output terminal 130 and the second output terminal 132 respectively. The connections to the power supply terminals enable current to be supplied to the controller 150 such that it may perform its function of controlling the first synchronous rectifier 140.

FIG. 1 also shows a second synchronous rectifier 160 with a first-conduction-channel terminal 162, a second-conduction-channel terminal 164 and a control terminal 166. The second synchronous rectifier may also comprise a field effect transistor. The first-conduction-channel terminal 162 is connected to the second output terminal 132, and the second-conduction-channel terminal is connected to the second transformer winding 122. The first-conduction-channel terminal 162, the second-conduction-channel terminal 164 and the control terminal 166 of the second synchronous rectifier 160 are all connected to respective terminals of the controller 150 in a way similar to the corresponding connections between the first synchronous rectifier 140 and the controller 150. Thereby, the controller 150 is enabled to control the second synchronous rectifier 160 in a way similar to the control of the first synchronous rectifier 140. Since the control and functioning of the second synchronous rectifier 160 corresponds to the control and functioning of the first synchronous rectifier 140, the second synchronous rectifier 160 will not be discussed further in order to improve the clarity of the disclosure.

The first synchronous rectifier 140 and the second synchronous rectifier 160 are controlled such that they provide the functionality of rectifiers at the output side of the SMPS 100. In particular, in this example the first synchronous rectifier 140 is forward biased for a positive voltage across the primary winding 108 and the second synchronous rectifier 160 is forward biased for a negative voltage across the primary winding 108.

In some examples the power switch (or switches) of a SMPS may be controlled such that the SMPS operates in a burst mode, particularly where the load presented to the SMPS is relatively light. A burst mode of operation may comprise providing a plurality of pulses of operation (or a 'burst' of current switching operations), where the plurality of pulses have a short discrete time interval between successive pulses, followed by a relatively long time interval before a subsequent plurality of pulses is provided. A burst mode of operation can be advantageous where continuous operation would result in a switching frequency that could cause audible artefacts. During periods between pulses or between bursts of pulses the controller 150 may still consume electrical power. However, during these periods the controller 150 may not require as much electrical power as during active switching since between current pulses as there is no requirement to control the first synchronous rectifier 140.

Examples disclosed herein relate to identifying times at which the controller 150 can function satisfactorily with a reduced current level, and reducing the amount of current drawn by the controller 150 at those times. The controller 150 may reduce the amount of current that it draws by reducing the internal bias currents and/or by putting several parts of the internal circuitry in a sleep mode with very low or zero current consumption that it presents between its first and second power supply terminals 152, 154. Therefore, the controller may switch between drawing the normal-mode current and the energy-saving-mode current by changing the load presented at the first and second power supply terminals 152, 154.

Figure 2:
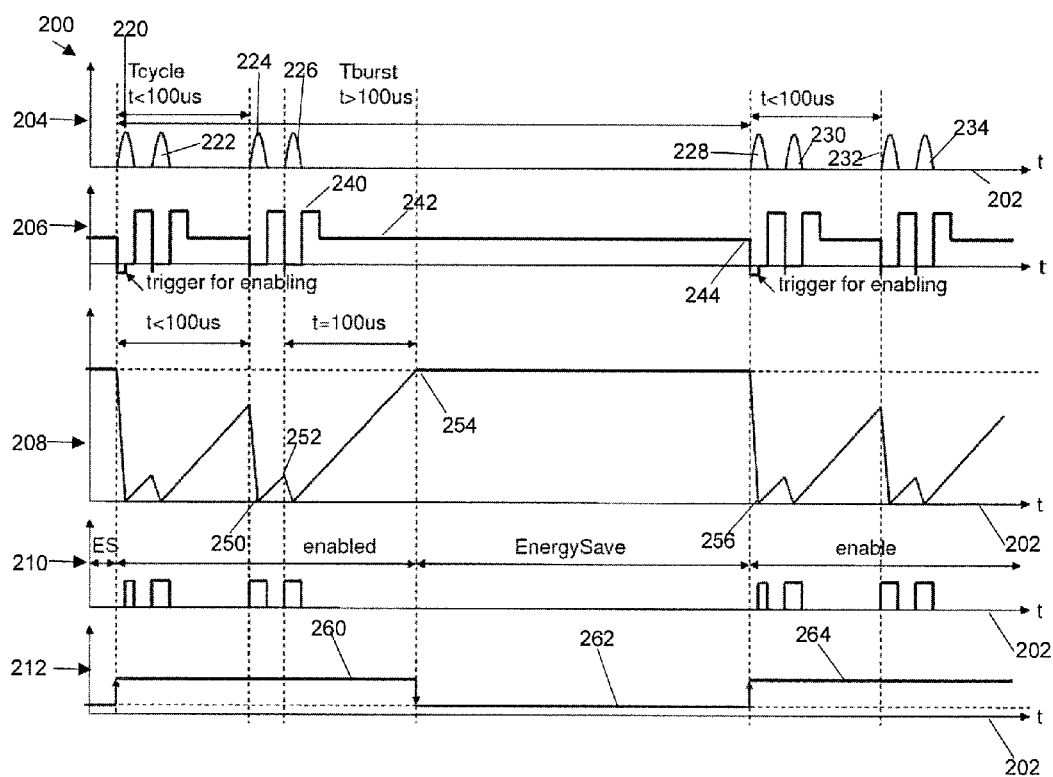
FIG. 2 shows charts for various signals in the switched mode power supply of FIG. 1.

FIG. 2 shows five charts that illustrate the behaviour of the controller of FIG. 1, as a function of time. It will be appreciated that a horizontal time axis 202 of each chart corresponds to the same period of time and that points on each time axis that are vertically aligned correspond to the same point in time during the particular period. A first chart 204 shows current pulses supplied by one of the secondary windings of the SMPS to the load. A second chart 206 shows a voltage across the synchronous rectifier. A third chart 208 shows a ramp of a timer based on the changes in the voltage shown in the second chart 206, the ramp can be considered as representing a count. A fourth chart 210 shows a voltage control signal applied to the control terminal of the synchronous rectifier. A fifth chart 212 shows electrical current supplied to the controller.

The first chart 202 shows a first burst of two current pulses in which a first pulse 220 is followed by a second pulse 222, the pulses being separated by a short time interval. A certain period after the second pulse 222 a second burst of pulses is provided, comprising a third pulse 224 and a fourth pulse 226 separated by another short time interval. After the fourth pulse a longer time period elapses before a third burst of pluses is provided, comprising a fifth pulse 228 and a sixth pulse 230. After a short period of time a fourth burst of pulses is provided, comprising a seventh pulse 232 and an eight pulse 234.

For the duration of each of the current pulses shown in the first chart, the synchronous rectifier is forward biased and therefore, as shown in the fourth chart 210, the control signal provided to the synchronous rectifier is such that a current is allowed to flow from the first-conduction-channel terminal to the second-conduction-channel terminal.

When the synchronous rectifier is configured to conduct, the voltage across the synchronous rectifier, shown in the second chart 206, we be at a low, approximately zero, level. For example, during the fourth current pulse 226, the voltage across the synchronous rectifier is approximately zero. After conduction of the current pulse has been completed, the voltage across the synchronous rectifier rises to a high level 240 for a period of time whilst the synchronous rectifier is open circuit and the other synchronous rectifier is conducting. Then the voltage across the synchronous rectifier falls to the output voltage 242 (voltage of node 130 in FIG. 1) whilst the SMPS is inactive between bursts.

The third chart 208 shows that a timer associated with the controller is reset to zero each time a current pulse is provided, or equivalently each time the synchronous rectifier voltage is reduced to a low level. For example, the time falls to zero 250 with the onset of the third current pulse 224. The timer then rises, as time elapses, to a particular value 252, before then being reset to zero for a second time as a result of the fourth current pulse 226. The timer then rises again, as time elapses to a particular threshold value 254. In some examples the threshold value may be 100 µs.

Once the timer has reached the particular threshold 254, whatever the actual threshold value is chosen to be, the controller changes the amount of current that it consumes at its power supply terminals. This is illustrated by the fifth chart 212 that shows that during periods of time in which current pulses are being provided, and hence the timer has not reached the particular threshold 254, the controller consumes a particular current that corresponds to a normal-mode current 260, which is without the current for charging the gates of the synchronous rectifiers. Once the timer has reached the particular threshold value 254, which provides satisfaction of a time criterion, the controller is configured to reduce its current consumption to a power-saving-mode current 262 which advantageously provides for a higher energy efficiency for the switched mode power supply.

When the controller is operating in the power-saving-mode of operation the controller may not have sufficient current to operate the synchronous rectifier at high frequency with fast charging and discharging of the gate of the synchronous rectifier. However, the power-saving-mode of operation may still comprise consumption of a sufficient amount of current, the power-saving-mode current, such that the controller may identify a newly received current pulse and be able to rapidly increase its current consumption, back to a normal-mode current, thereby enabling the controller to provide active rectification for the next current pulse. For example, the fifth chart 212 shows that the current may increase to a normal-mode current 264 in response to the fall in synchronous rectifier voltage 244 associated with the provision of the fifth current pulse 228. The fall in the synchronous rectifier voltage 244 also resets the timer back to zero, such that the process of monitoring the time that has elapsed since the most recent current pulse can begin again. In this way, the controller is configured to provide for a transition to the power-saving-mode of operation based on satisfaction of the time criterion and back to the normal-mode of operation based on satisfaction of a voltage criterion relating to the synchronous rectifier.

In this way, each current pulse can be considered as waking up the circuit if it is in energy save mode. They also reset the timer that is used for monitoring the time after a current pulse. Transition to energy save mode can happen 100 us after the last current pulse unless a new current pulse will be converted, which results in the timer being reset again.

An alternative for monitoring the non-switching time is by detecting the end-of-conduction in the synchronous rectifier. The end-of-conduction is followed by a rise of the drain voltage, as shown second chart 206 of FIG. 2. The transition to energy save state is then initiated by a voltage comparison between the drain voltage and a positive reference voltage with a level below the output voltage 242. The result is that for each current pulse, the synchronous rectifier controller first wakes up, than the synchronous rectifier controller operates the synchronous rectifier and eventually at rising drain voltage the synchronous rectifier controller transitions to the energy save state. This operation can be sub-optimal in some examples because waking-up requires some time, which can reduce the conduction time of the synchronous rectifier. In a resonant converter, a rising drain voltage of one channel can occur simultaneously with the body diode conduction of the other channel, which can cause unnecessary toggling between energy save state and enable state, and may benefit from priority setting of the enable state.

In some examples, the method for the transition from normal mode of operation to power-saving mode of operation operates by monitoring the drain voltage of a synchronous rectifier FET and reducing the supply current to a minimum level if the drain voltage exceeds a predefined positive threshold. The positive threshold voltage may be related to the output voltage of the SMPS. The method for the transition from power-saving mode of operation to normal mode of operation operates by monitoring the negative voltage over the synchronous rectification FET and switching quickly to the normal operation state for synchronous rectification.

When a SMPS comprises two synchronous rectifiers, the controller may monitor voltages relating to both of the synchronous rectifiers. Satisfaction of a voltage criterion in relation to either synchronous rectifier may result in the controller resetting the timer, when the controller is in the normal-mode of operation. If the controller is in the power-saving-mode of operation, then it may change to the normal-mode of operation, before providing active rectification for the associated current pulse.

Also, where the SMPS comprises two synchronous rectifiers, the controller may be further configured to determine satisfaction of a second voltage criterion when a second conduction channel voltage between the first-conduction-channel terminal of the second synchronous rectifier and the second-conduction-channel terminal of the second synchronous rectifier meets the first pre-determined voltage threshold. A first voltage criterion, in relation to a first synchronous rectifier, may be the same as the second voltage criterion in relation to the second synchronous rectifier.

In examples where two synchronous rectifiers are present in the SMPS, the controller may be further configured to provide for a normal mode of operation based on satisfaction of the second voltage criterion and a power-saving mode of operation based on satisfaction of the second time criterion.

The controller may enter the power-saving mode of operation when both the time criterion for the first synchronous rectifier and the second time criterion for the second synchronous rectifier are satisfied, in which case the two time criterion may be considered together as a single, common time criterion. Also, the controller may enter the normal mode of operation when a voltage criterion has been met for only one of the first synchronous rectifier and the second synchronous rectifier.

In examples where the primary side of the SMPS is galvanically isolated from the secondary side of the SMPS the present disclosure may be particularly advantageous. The controller for the synchronous rectifier will be located in the secondary side of the SMPS, and therefore may be isolated from the power switch at the primary side. Although the controller is galvanically isolated from the primary side power switch, the controller may still react to changes in the performance of the primary side, as more or less power is provided by the primary side in response to changes in the load presented to the secondary side. Embodiments disclosed herein that can change between a power-saving mode of operation and a normal mode of operation in the manner described, can be considered advantageous over using a direct connection between the power switch on the primary side and the controller for the synchronous rectifier at the secondary side. Such a connection would disadvantageously require additional circuitry, complexity, energy consumption and expense.

Examples disclosed herein can be considered advantageous because:
  they may not require an additional secondary control, such as a microprocessor control, for enabling and disabling the synchronous rectifier. This could increase cost and require a clear detection criterion and also an additional input pin on the synchronous rectifier controller.
  they can provide good light load efficiency.
    This may be in contrast to resonant converters that detect light load by identifying a high switching frequency and then disabling the synchronous rectifier at a load point where the synchronous rectifier is still beneficial. Such a resonant converter can degrade the light load efficiency.

This may be in contrast to flyback converters that detect light load by identifying a short secondary conduction time or a low integral of the secondary transformer voltage and then disabling the synchronous rectifier at a load point where the synchronous rectifier is still beneficial. Such a flyback converter can degrade the light load efficiency.

they can avoid, or reduce the likelihood of, repetitive enabling and disabling of the synchronous rectifier at stationary light load, which otherwise could cause instability in the control and increase ripple.

they may not require use of calibration cycles, which may be used in adaptive control, and therefore they can operate effectively in burst mode systems and systems where consecutive cycles can be very different in current amplitude and in cycle time, and also where cycles can start and stop abruptly.

they can operate automatically. For example without external circuitry for light load detection. Automatic energy save control can easily be incorporated in the controller of the synchronous rectifier.

they can operate autonomously. For example, the energy save control can use information already available on the sense pins of the controller without the need for additional information from the outside world.

they can operate Independently. For example they may apply no restrictions for the primary control of the SMPS.

Figure 3:
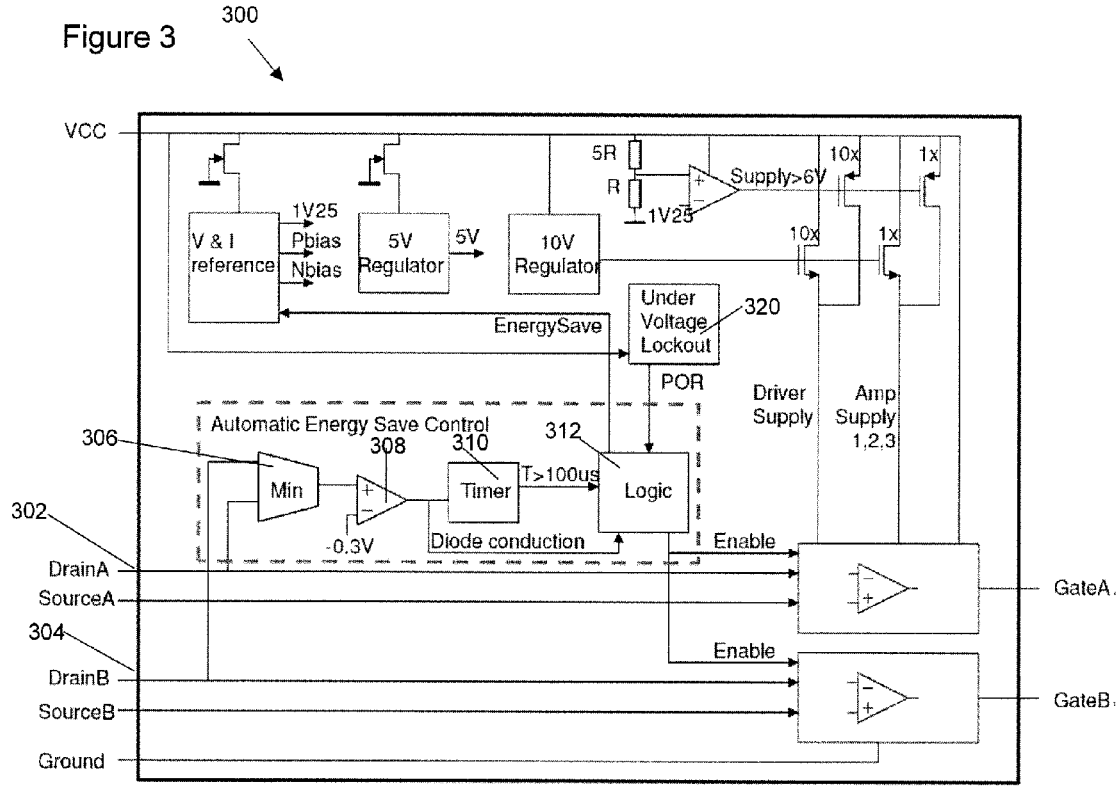
FIG. 3 shows a schematic diagram of a controller for a switched mode power supply.

FIG. 3 provides a schematic illustration of a controller 300, for synchronous rectification in a resonant converter type switched mode power supply, according to an embodiment of the present disclosure. The controller 300 has a connection 302 to a conduction terminal of a first synchronous rectifier and a second connection 304 to the conduction terminal of a second synchronous rectifier. In some examples the conduction terminals may be the drain terminals of field effect transistors. The controller 300 has a first voltage comparator 306 that is connected to (i) the conduction terminal of the first synchronous rectifier and (ii) the conduction terminal of the second synchronous rectifier. The comparator 306 selects the lower of the two voltages at any given point in time and supplies that voltage to a second comparator 308. The second comparator 308 compares the voltage supplied by the first comparator 306 with a suitable reference voltage. If the compared voltage is less than the reference voltage then the second comparator supplies information to a timer 310 to reset the timer 310 to a value of zero time. Once the timer 310 has been set to a value of zero time, the timer 310 counts upwards towards a pre-defined time threshold. If the timer 310 does not receive information from the second comparator 308 to reset before reaching the pre-defined time threshold then the timer 310 supplies information representative of a time criterion having been satisfied to a logic block 312. The logic block 312 then configures the controller to transition to the energy-saving-mode of operation. The logic block 312 is also connected to the second voltage comparator 308 and is configured to receive information from the second voltage comparator 308 if a voltage criterion is satisfied, such as where the second voltage comparator 308 determines that the voltage supplied by the first voltage comparator 306 has fallen below a pre-determined voltage threshold. When the logic block 312 receives information representative of satisfaction of the voltage criteria and the controller 300 is in an energy-saving-mode of operation, the logic block 312 is configured to transition the controller 300 into a normal-mode of operation.

FIG. 3 also shows an optional under voltage lockout block 320. The operation of an under voltage lockout block 320 is discussed below in relation to FIG. 6.

Figure 4:
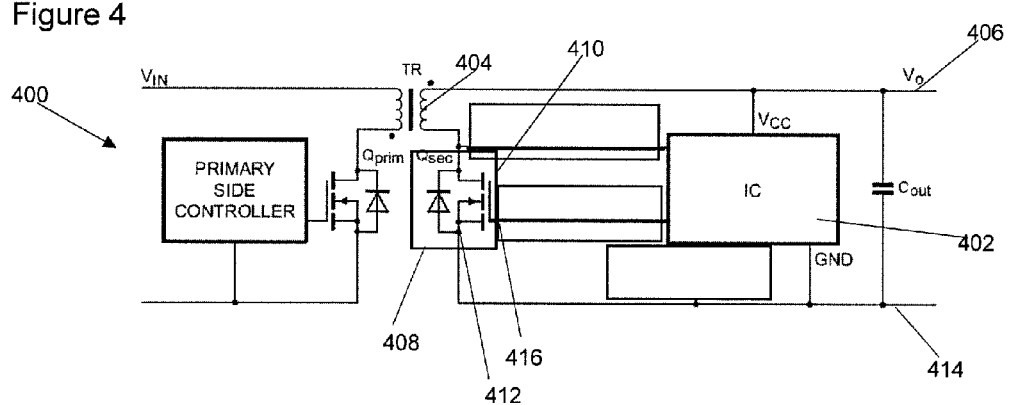
FIG. 4 shows another switched mode power supply.

FIG. 4 shows a circuit diagram for a SMPS 400 comprising a controller 402 according to an embodiment of the present disclosure. The SMPS 400 comprises a single secondary winding 404 of a transformer that is connected to a high-side-output terminal 406. The winding 404 is also connected to a first-conduction terminal 410 of a switch 408. The switch 408 further comprises a second conduction terminal 412 which is connected to a low-side-output terminal 414. In some examples the low-side-output terminal may also be connected to electrical ground. In this example, the ground is the reference terminal for the output voltage, for the controller IC 402, and for the switch 408.

Figure 5:
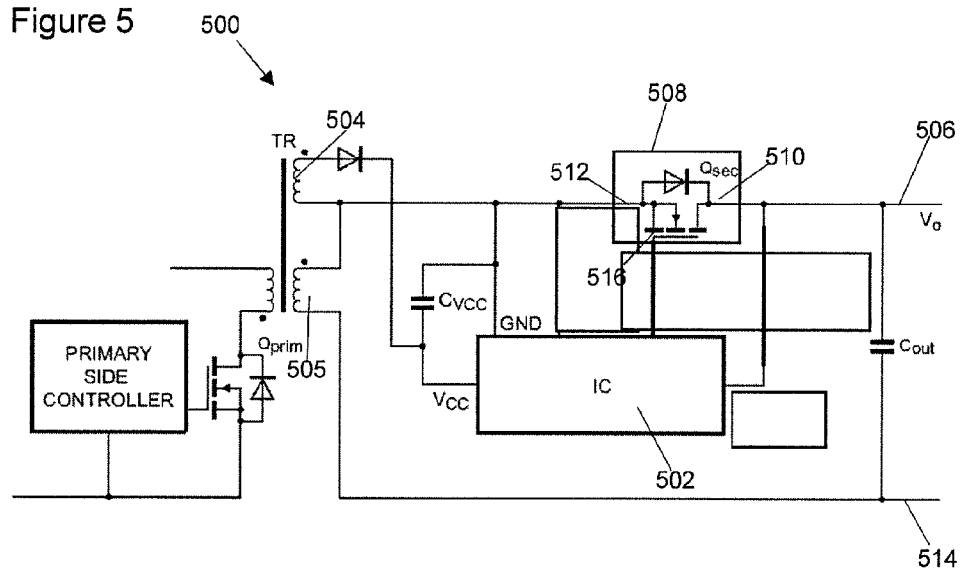
FIG. 5 shows a further switched mode power supply.

FIG. 5 shows a circuit diagram for a SMPS 500 comprising a controller 502 according to an embodiment of the present disclosure. The SMPS 500 comprises a first secondary winding 505 of a transformer that is connected to a high-side-output terminal 506 via a synchronous rectifier 508. The synchronous rectifier 508 is also connected to a second secondary winding 505 of the transformer. The second secondary winding 504 is connected to the source terminal 512 of the synchronous rectifier. In some examples the low-side terminal may be connected to electrical ground. In this example, the ground is the reference terminal for the output voltage. The source terminal 512 of the synchronous rectifier 508, which is connected to the node between the first secondary winding 505 and the second secondary winding 504, is the reference terminal for the controller IC 502, and for the synchronous rectifier 508.

It will be appreciated that, in relation to FIGS. 4 and 5, the present disclosure is equally relevant to controllers configured to control synchronous rectifiers connected to either the low-side output, as shown in FIG. 4, or the high-side output, as shown in FIG. 5.

Figure 6:
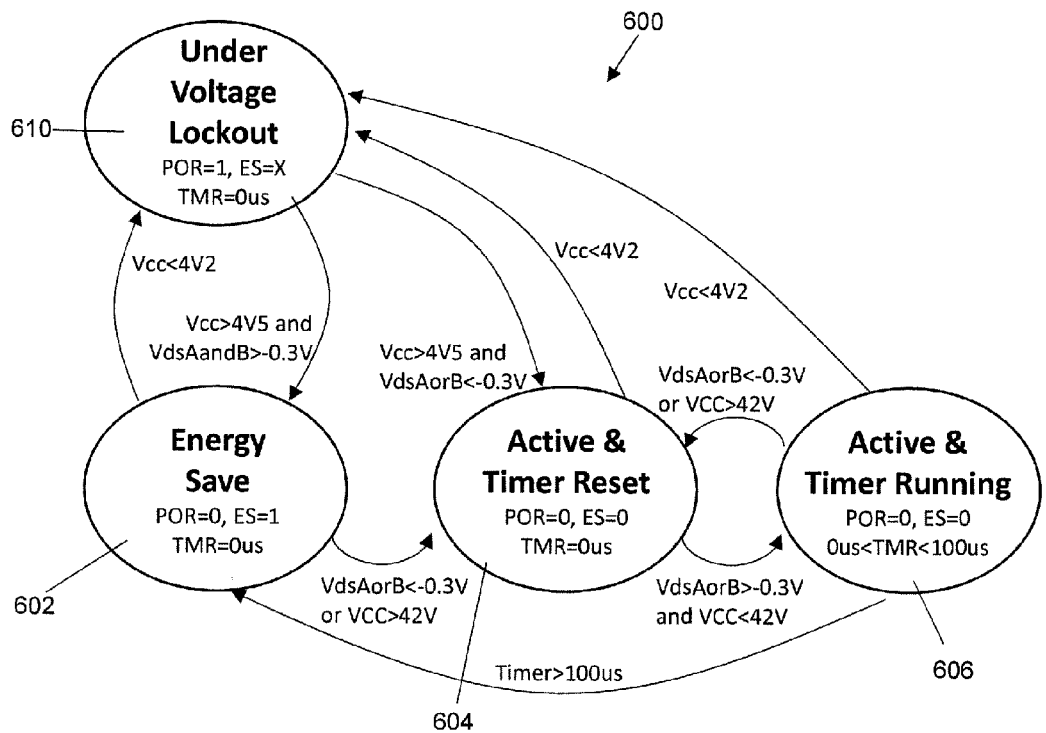
FIG. 6 shows a state diagram that depicts transitions between different operating states of a controller for a switched mode power supply.

FIG. 6 shows a state diagram for a controller according to embodiments of the present disclosure. At a particular point in time the controller may be in an energy-saving mode of operation 602. If the controller detects that a voltage associated with a synchronous rectifier satisfies a voltage criterion (VdsAorB<−0.3V), then the controller transitions to a normal-mode of operation 604 in which the controller draws a normal-mode current and in which a timer is reset. Once the timer has been reset, the controller transitions to a normal mode of operation with the timer running 606. If the timer reaches a pre-determined time threshold (Timer>100 us) then the controller transitions back to the energy-saving mode of operation 602. Alternatively, if before the controller reaches the pre-determined time threshold the controller detects that a voltage associated with the synchronous rectifier satisfies the voltage criterion (VdsAorB<−0.3V), then the controller transitions to the normal-mode of operation with the timer reset to zero 604.

FIG. 6 also shows an optional under voltage lockout state (UVLS) 610. In this example the UVLS 610 acts as a safety measure. If the controller detects that the voltage supplied to the controller, to enable the controller to perform its function of controlling the synchronous rectifier, falls below a pre-determined threshold (Vcc<4V2) such that the controller would not be capable of performing the function, then the controller transitions to the under voltage lockout state 610. While in UVLS 610 the controller will not attempt to control the synchronous rectifier. While in UVLS 610 the controller will continue to monitor the voltage supplied to the controller to detect any point in time when the voltage exceed the pre-determined threshold (Vcc>4V5) such that the controller may successfully control the synchronous rectifier. If the controller detects a sufficient voltage while in the UVLS 610, the controller will transition to the normal-mode of operation with the timer reset 604 if the voltage associated with the switch satisfies the voltage criterion (VdsAorB<−0.3V). If the voltage criterion is not satisfied (VdsAandB>−0.3V) then the controller will instead transition to the energy-saving mode of operation 602.

The pre-determined time threshold may be set as any convenient value. In some examples the pre-determined time may be zero. The controller may thereby transition to an energy saving mode of operation immediately after each pulse of current has been delivered. Thereby, the energy consumed by the controller may be reduced after each current pulse and the efficiency of the controller may be improved.

In some examples, the pre-determined time may be larger than 50 microseconds. This can be advantageous because a SMPS can enter a burst mode at low power for avoiding the switching operation in the audible region below 20 kHz. It may be beneficial to ensure that audible frequencies are not generated by the SMPS as they may be annoying to nearby people.

The voltage associated with the synchronous rectifier, which is used to reset the timer or to cause the controller to transition into the energy-saving mode, may be the voltage between the first-conduction-channel terminal and the second-conduction-channel terminal of the synchronous rectifier.

In other examples the voltage associated with the synchronous rectifier may be a control terminal voltage. If the switch comprises a field effect transistor then the control terminal voltage will be the gate voltage. In examples where a control terminal voltage is used as the voltage associated with the synchronous rectifier that is processed to determine satisfaction of a time criterion, a pre-determined time of zero may be particularly well-suited.

In some examples the synchronous rectifier may comprise a transistor with a body diode with a particular forward voltage when the body diode is conducting. In such examples, the first pre-determined voltage threshold may be based on the particular forward voltage. For example the first pre-determined voltage threshold may be 30%, or 40% or 50% of the forward voltage. In this way the transition to the normal-mode of operation may be triggered when the body diode starts to conduct a current pulse.

The magnitude of the normal-mode current without the current for charging the gates of the synchronous rectifiers may be 2, 5, or 10 times greater than the magnitude of the power-saving mode current. Thereby, when the controller is in power-saving mode the power consumed by the controller may be 2, 5, or 10 time less than the power consumed in the normal-mode when switching is nevertheless not required.

The magnitude of the power-saving mode current may be 100 microamps. This amount of current may provide the controller with sufficient current to enable it to transition back to the normal mode of operation sufficiently quickly to provide for active rectification of the first current pulse provided after a period of time spent in the power-saving mode of operation, while consuming an acceptably low level of power while the controller is in the power-saving mode of operation. This can be considered as providing synchronous rectification at any load.

In some examples a SMPS may be configured to operate in a burst mode of operation, particularly, although not necessarily, when the SMPS is subject to a low load. A burst mode may comprise provision of a plurality of current pulses, a so-called 'burst', followed by a period of time in which no current pulses are provided, followed by repetition of providing a burst of current pulses followed by a successive period in which no current pulses are delivered. The total time for a cycle of providing a burst of current pulses followed by a period of time with no current pulses may be a fixed value, at least for a particular value of the load presented to the SMPS. The cycle may thereby be said to have a particular periodicity. The pre-determined time may be based on the particular periodicity. For example, the pre-determined time may be 1% or 2% or 5% or 10% of the particular periodicity. Such percentages may enable a desired level of power saving while providing for the possibility for the controller to continue to provide active rectification without entering the power-saving mode, if the periodicity changes as a result of a change in the load presented to the SMPS. In some examples the current pulse amplitude and cycle times may be very different and may start or stop abruptly.

In some examples, a SMPS may operate in a frequency modulation mode, a pulse frequency modulation mode or in a pulse width modulation mode or in a combination of these modes. In such examples there may occur periods of time in which current pulses are not provided. During such periods a controller may advantageously transition to a power-saving mode and then transition back to a normal mode when current pulses are provided, in accordance with embodiments of the present disclosure.

An integrated circuit may comprise a controller according to embodiments of the present disclosure. A single integrated circuit may provide a convenient form for integrating the controller into a SMPS.

It will be appreciated that any components that are described herein as being coupled or connected could be directly or indirectly coupled or connected. That is, one or more components could be located between two components that are said to be coupled or connected whilst still enabling the required functionality to be achieved.

It will also be appreciated that any reference to "higher than", "lower than", etc, can refer to the parameter in question being less than or greater than a threshold value, or between two threshold values, depending upon the context.

The invention claimed is:

1. A controller for a switched mode power supply, wherein the controller is configured to be connected to a first-conduction-channel terminal, a second-conduction-channel terminal, and a control terminal of a first synchronous rectifier, the controller comprising:
   a voltage comparator configured to determine satisfaction of a first voltage criterion, wherein the first voltage criterion is satisfied when a conduction channel voltage between the first-conduction-channel terminal and the second-conduction-channel terminal meets a first pre-determined voltage threshold; and
   a timer configured to determine satisfaction of a first time criterion, wherein the first time criterion is satisfied when a voltage associated with the first synchronous rectifier meets a second predetermined voltage threshold for greater than a predetermined time; the controller configured to provide for a normal mode of operation based on satisfaction of the first voltage criterion and a power-saving mode of operation based on satisfaction of the first time criterion, the controller is configured to draw a power-saving-mode current in the power-saving mode of operation, and draw a normal-mode current in the normal mode of operation, and a magnitude of the normal-mode current is greater than a magnitude of the power-saving-mode current.

2. The controller of claim 1, wherein the voltage associated with the synchronous rectifier is a voltage between the first-conduction-channel terminal and the second-conduction-channel terminal.

3. The controller of claim 1, wherein the predetermined time is non-zero.

4. The controller of claim 1, wherein the voltage associated with the first synchronous rectifier is a control terminal voltage.

5. The controller of claim 4, wherein the predetermined time is zero.

6. The controller of claim 1, wherein the magnitude of the normal-mode current is at least 2 times greater than the magnitude of the power-saving-mode current.

7. The controller of claim 1, wherein the magnitude of the power-saving-mode current is 400 microamps or less.

8. The controller of claim 1, wherein the predetermined time is larger than 50 microseconds.

9. The controller of claim 1, wherein the switched mode power supply is configured to operate in a burst mode with a particular periodicity and the predetermined time is based on the particular periodicity.

10. The controller of claim 1, wherein the controller is configured to be connected to a first-conduction-channel terminal, a second-conduction-channel terminal, and a control terminal of a second synchronous rectifier, the controller further comprising:
a voltage comparator configured to determine satisfaction of a second voltage criterion when a second conduction channel voltage between the first-conduction-channel terminal of the second synchronous rectifier and the second-conduction-channel terminal of the second synchronous rectifier meets the first predetermined voltage threshold; and
a timer configured to determine satisfaction of a second time criterion, wherein the second time criterion is satisfied when a voltage associated with the second synchronous rectifier meets a second predetermined voltage threshold for greater than a predetermined time, and the controller is configured to provide for the normal mode of operation based on satisfaction of the second voltage criterion and the power-saving mode of operation based on satisfaction of the second time criterion.

11. The controller of claim 10, configured to provide for the power-saving mode of operation when both the first time criterion for the first synchronous rectifier and the second time criterion for the second synchronous rectifier are satisfied and provide for the normal mode of operation when either the first voltage criterion has been met the first synchronous rectifier or the second voltage criterion has been met for the second synchronous rectifier.

12. A switched mode power supply comprising:
a primary side; and
a secondary side, the secondary side comprising the controller of claim 1, and an associated synchronous rectifier.

13. The switched mode power supply of claim 12, wherein the synchronous rectifier comprises:
a Field Effect Transistor with a body diode having a particular forward voltage that is configured to operate as an active diode in accordance with a control signal received at its control terminal and the first predetermined voltage threshold is based on the particular forward voltage.

14. An integrated circuit comprising the controller of claim 1.

15. An integrated circuit comprising the controller of claim 1, and one or more associated synchronous rectifiers.

* * * * *